US005987734A

United States Patent [19]

Overgard et al.

[11] Patent Number: 5,987,734

[45] Date of Patent: Nov. 23, 1999

[54] SEMI-AUTOMATIC BLOCK AND TACKLE LACING MACHINE

[75] Inventors: Bruce L. Overgard, Colton; Kris D. Baymiller, Sioux Falls, both of S. Dak.; Walter Rohrbach, Burnsville; Walter Gysling, Shorewood, both of Minn.

[73] Assignee: Balance Systems, Inc., Sioux Falls, S. Dak.

[21] Appl. No.: 09/126,407

[22] Filed: Jul. 30, 1998

[51] Int. Cl.[6] .................... B23P 19/00

[52] U.S. Cl. .................... 29/700; 254/401

[58] Field of Search .................... 29/700; 254/401, 254/402, 403, 405; 112/2, 303, 470.21, 470.14

[56] References Cited

U.S. PATENT DOCUMENTS 3,986,256 10/1976 Kilpatrick et al. .................... 29/628
4,734,969 4/1988 Currier et al. .................... 29/157.3
5,511,502 4/1996 Moser et al. .................... 112/470.21

*Primary Examiner*—S. Thomas Hughes
*Assistant Examiner*—John C. Hong
*Attorney, Agent, or Firm*—Pettis & Van Royen, P.A.

[57] ABSTRACT

A semi-automatic lacing machine used to lace a pair of blocks together to form a block and tackle assembly that will frequently be used in the manufacture of other products. The apparatus includes a structure for receiving a pair of blocks and a line therein, and structure including a first and a second guide, and a threader to advance the line through the first and second guides and thereby through the blocks received within the apparatus.

11 Claims, 11 Drawing Sheets

SEMI-AUTOMATIC BLOCK AND TACKLE LACING MACHINE

BACKGROUND OF THE INVENTION

1. Field of the Invention

The present invention relates to a semi-automatic block and tackle lacing machine, that eliminates most of the manual aspects of lacing block and tackle assemblies. It is semi-automatic as each of the blocks are manually inserted into the apparatus and the first end of a line is fed into the apparatus, which then automatically feeds the line through the blocks to complete the lacing operation.

2. Description of the Prior Art

Block and tackle assemblies are best known as devices used to obtain a mechanical advantage when moving large heavy objects. They are frequently attached to the hoist lines of cranes for vertical movement and to other devices for lateral movement. When moving heavy objects the block and tackle assembly must be large and heavy to withstand the stresses applied by the heavy loads. Threading of these large block and tackle assemblies has always been a manual task and will likely remain a manual task, since rigging such devices is usually done in the field for a series of lifts and is not a repetitive activity. Small block and tackle assemblies are a structural element of other products, particularly window balances. Window balances are attached to window sashes to reduce the effort required to raise them and also to hold them at any point between their open and closed positions by providing a counter balancing force to the weight of the window sash. A block and tackle assembly is comprised of at least two blocks and a line laced therebetween. Each block includes at least one sheave mounted therein. Currently during the manufacture of window balances, each block and tackle assembly is laced manually by attaching one end of a line to a first block, threading the free end of the line through a second block so that it passes over the sheave of the second block, threading the line back through the first block and over the corresponding sheave of that block and then returning the free end of the line toward the second block. Lacing a block and tackle assembly over a single sheave in each block provides a mechanical advantage of 2 to 1. Most window balances use a block and tackle assembly with a mechanical advantage of 4 to 1, which requires the line to be threaded over a second sheave in each block. Manual lacing of window balance assemblies is being done by hand, a slow and tedious process.

Automation of manufacturing processes increases production and reduces costs. Therefore there is a need for an apparatus that quickly laces block and tackle assemblies and is easy and safe to use.

SUMMARY OF THE INVENTION

The present invention relates to a semi-automatic lacing apparatus for threading a block and tackle assembly, thereby eliminating the slow and error prone manual method now used. A block and tackle assembly includes a first block and a second block that each have at least one sheave mounted therein, and a line laced therethrough. Lacing is accomplished by attaching the first end of the line to the first block and threading the second end of the line through a second block and over its sheave and back through the first block and over its sheave.

Most simply stated, the semi-automatic lacing machine comprises a frame to which is mounted a plate having a first block receiver and a second block receiver. The first and second block receivers are formed within the plate so that each block receiver has a first side and a second side. The first block receiver is sized and configured to receive the first block of a block and tackle assembly therein and the second block receiver is sized and configured to receive the second block. The plate further comprises a first guide and a second guide. The first guide has a first end that is adjacent the first side of the first block receiver and a second end that is adjacent the first side of the second block receiver. The second guide has a first end that is adjacent the second side of the second block receiver and a second end that is adjacent the second side of the first block receiver. An entry port lies adjacent the first end of the first guide, the entry port being sized and configured to receive a line therethrough. The second end of tho second guide comprises an exit port.

At least one threader is mounted to the frame and is configured to engage a line that has been inserted through the entry port and into the first guide. The threader advances the line through the first block receiver, the first guide, the second block receiver, and the second guide. Therefore, when a first block is received in the first block receiver and a second block is received in the second block receiver, and the line is advanced, it passes between the first block and its sheave and then between the second block and its sheave so that the blocks are laced to one another by the line.

The invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout several views of the drawings. In the second embodiment illustrated in FIG. 13, reference characters for similar parts of the embodiment of FIG. 1 are increased by increments of 200.

DESCRIPTION OF A PREFERRED EMBODIMENT

Figure 11:
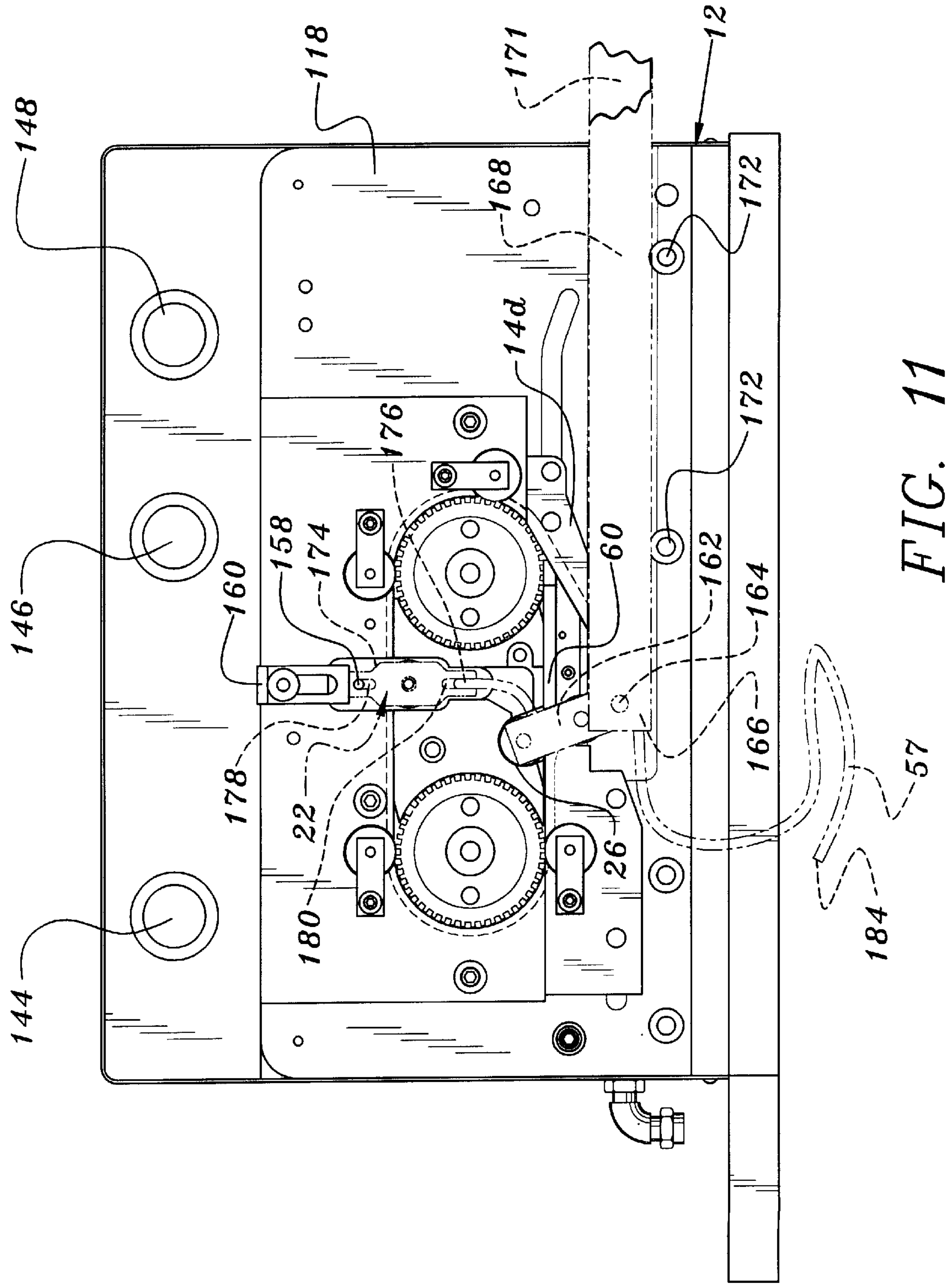
FIG. 11 is a front elevational view of the apparatus of FIG. 1 illustrating the placement of the first and second block in the apparatus and the insertion of the line in the entry port.
Figure 12:
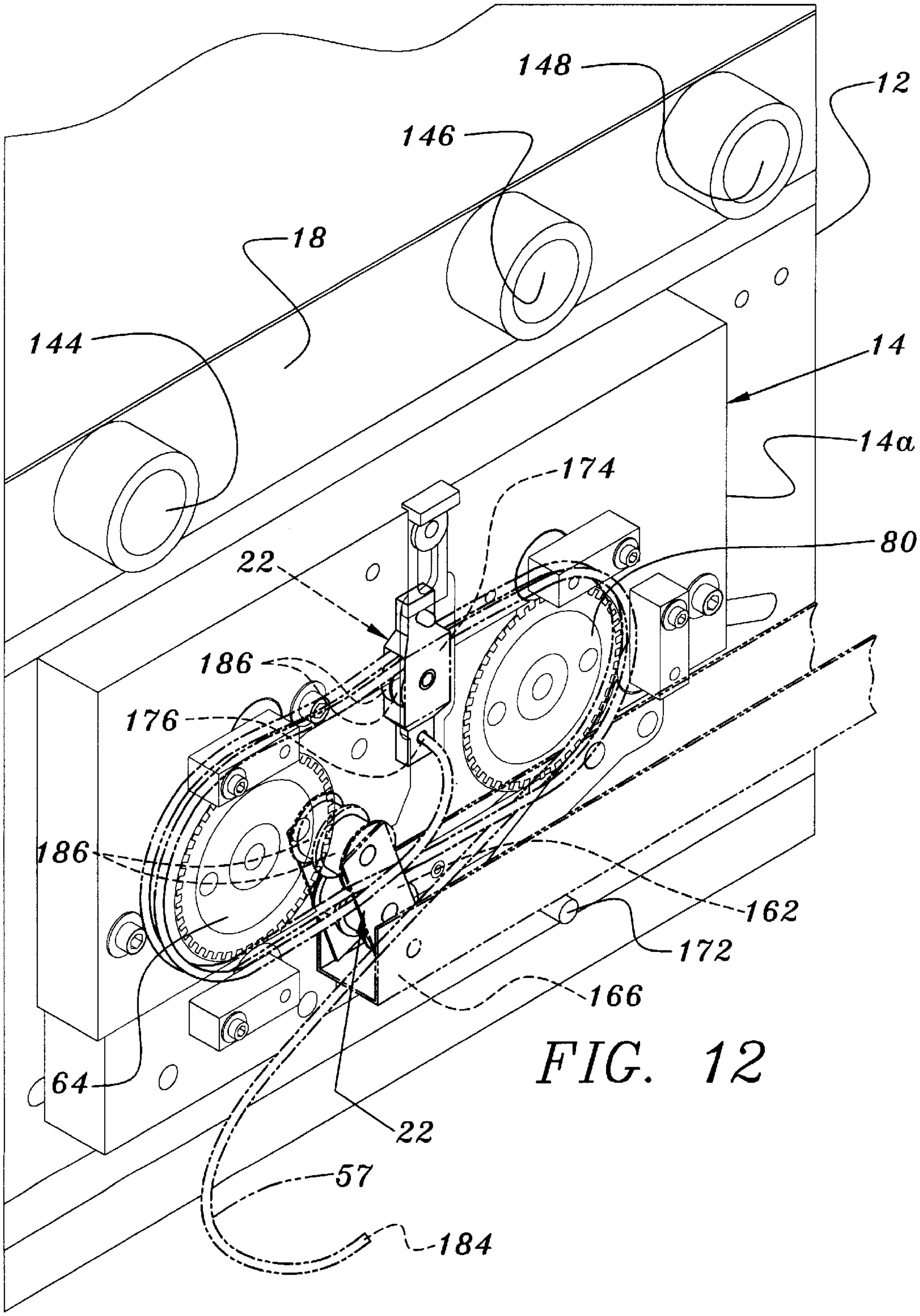
FIG. 12 is an isometric detailed view of the invention of FIG. 1 illustrating completion of the lacing operation with much of the apparatus shown as transparent to illustrate the position of the line at completion.
Figure 13:
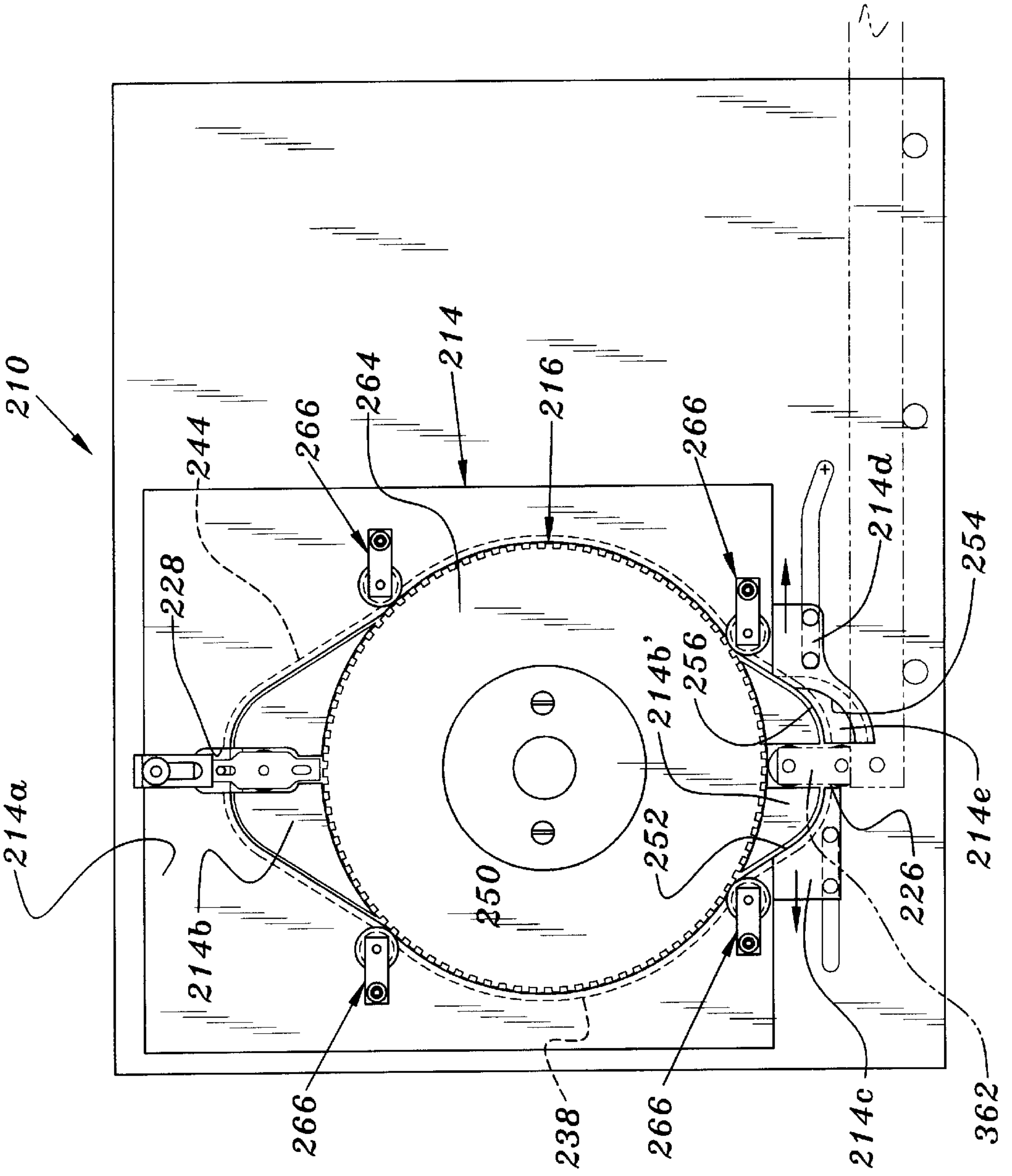
FIG. 13 is a second embodiment of the invention of FIG. 1.

A preferred embodiment of the semi-automatic block and tackle lacing apparatus is illustrated in the drawing FIGS. 1–12 in which the apparatus for lacing a block and tackle assembly is generally indicated as 10. In FIG. 13, a second preferred embodiment of the invention is illustrated and generally indicated as 210.

Figure 1:
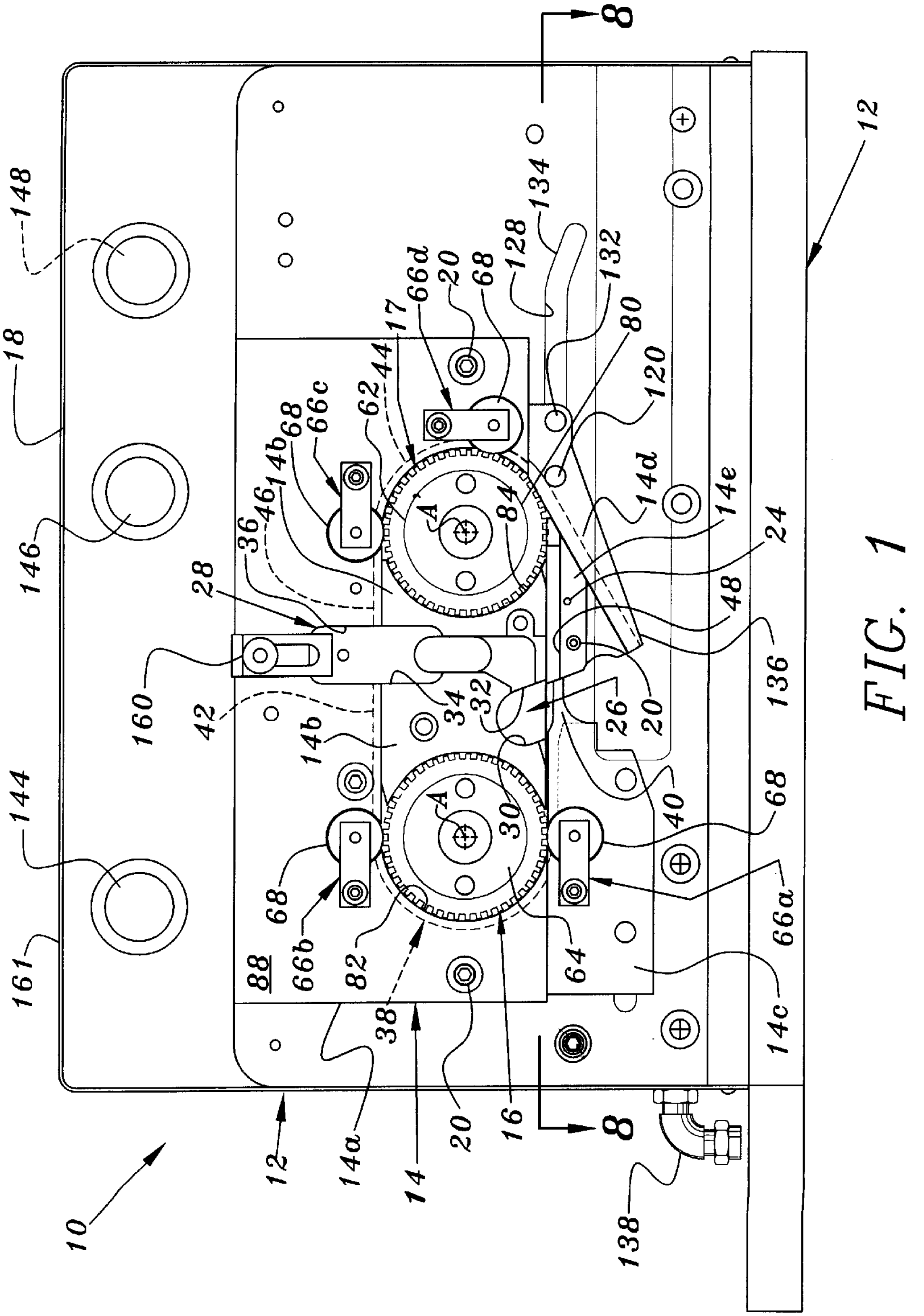
FIG. 1 is a front elevational view of the semi-automatic block and tackle lacing machine of this invention.
Figure 2:
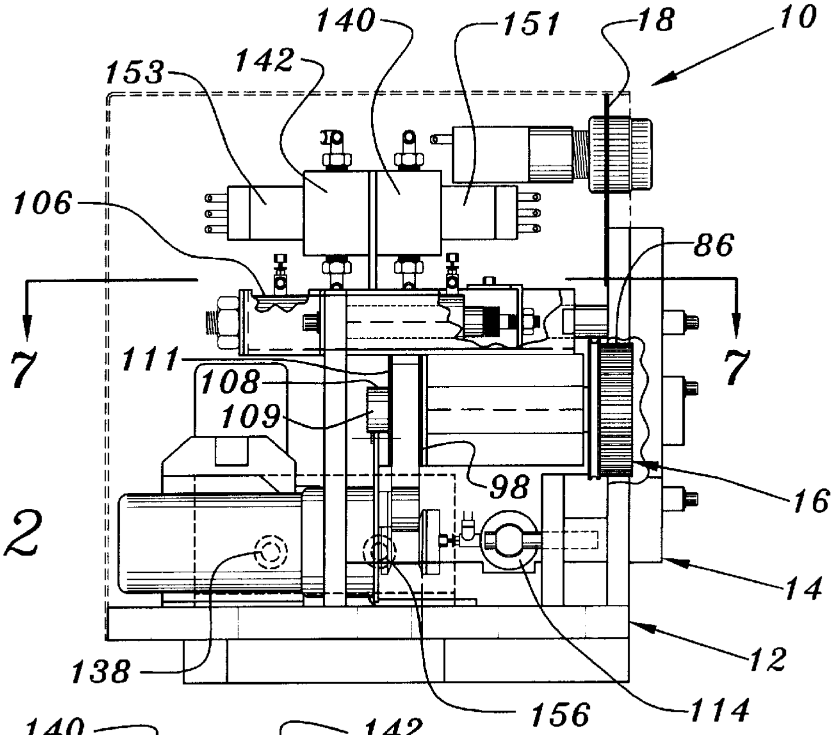
FIG. 2 is a left side elevational view of the invention of FIG. 1.
Figure 5:
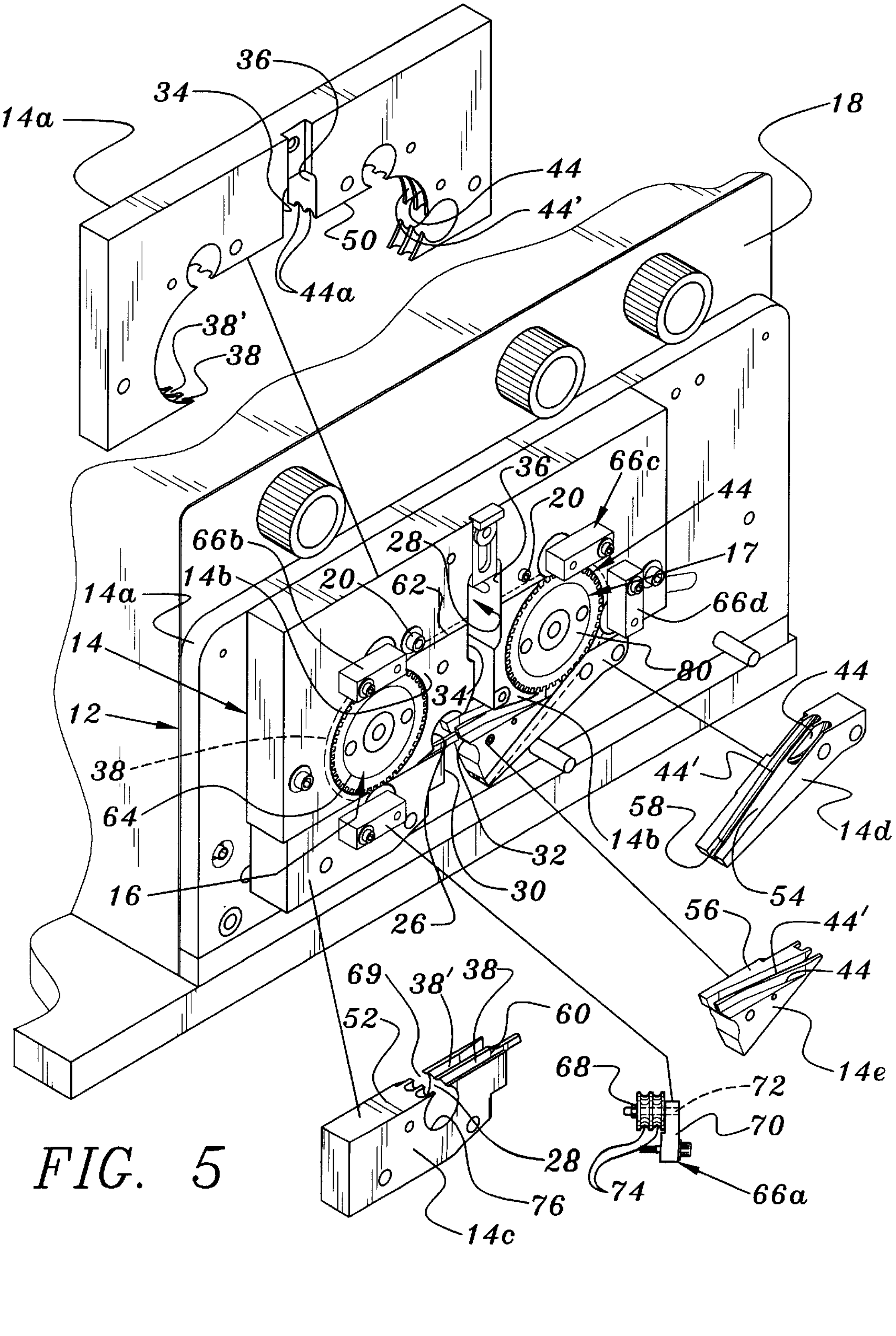
FIG. 5 is a partial isometric view of the invention of FIG. 1 including details of the plate.
Figure 6:
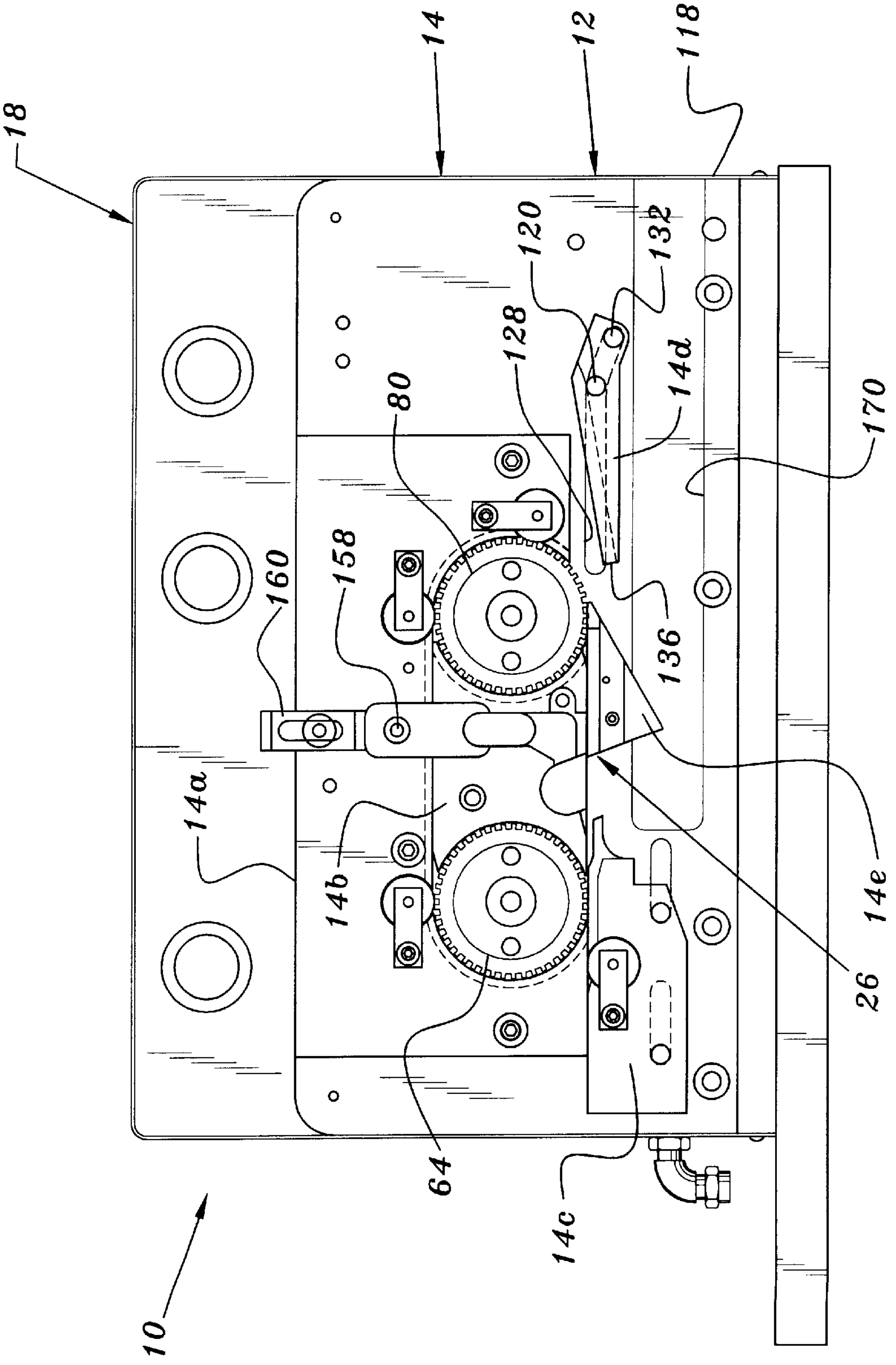
FIG. 6 is a front elevational view of FIG. 1 illustrating portions of the plate moved from the operational position to the open position.

In FIGS. 1–4, it can be seen that the lacing apparatus 10 comprises a frame shown generally as 12, a plate shown generally as 14, a threader shown generally as 16, and a control panel 18. As seen in FIGS. 1 and 5 the plate 14 is comprised of five parts, first part 14*a*, second part 14*b*, third part 14*c*, fourth part 14*d* and fifth part 14*e*. The first part 14*a* is bolted to the frame by bolts 20, second part 14*b*, third part 14*c* and fourth part 14*d* are each slidably attached to the frame 12 and fifth part 14*e* is bolted to the frame by a bolt 20 and a pin 24. The sliding parts 14*b*, 14*c*, and 14*d* are movable between an operative position and an open position. In the open position, as shown in FIG. 6, the plates are out of the way for easy removal of the block and tackle assembly, shown generally as 22 in FIG. 12, once the block and tackle assembly has been laced.

The plate 14 has a first block receiver 26 and a second block receiver 28. The first block receiver 26 has a first side 30 and a second side 32, and the second block receiver has a first side 34 and a second side 36.

Figure 10:
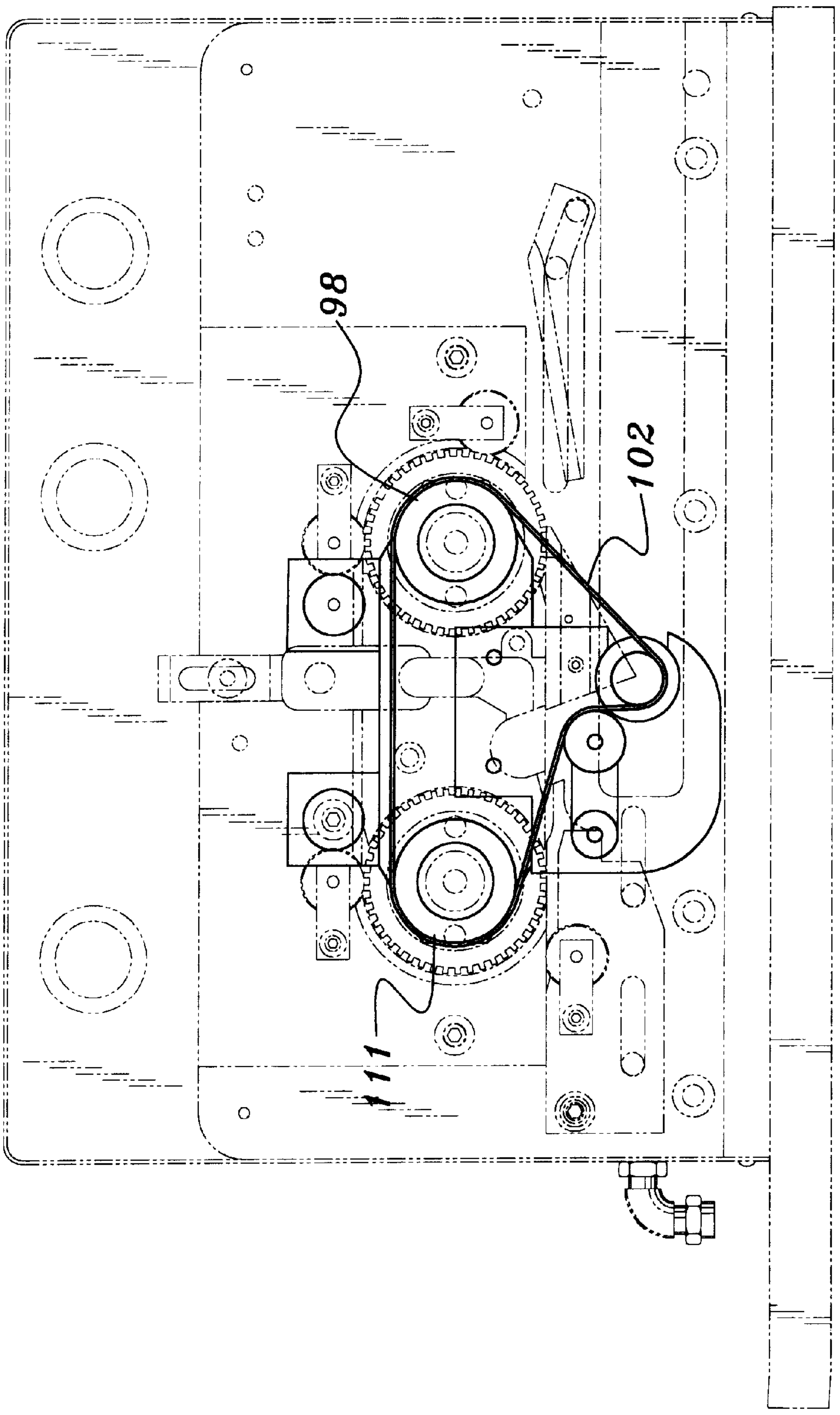
FIG. 10 is a front elevational view of the invention of FIG. 1 with much of the apparatus shown in phantom to further illustrate the driving means of the threader of FIG. 9.

The plate 14 further comprises a first guide, conveniently at least one groove 38, that has a first end 40 that is adjacent the first side 30 of the first block receiver 26 and a second end 42 that is adjacent the first side 34 of the second block receiver 28. The plate 14 further comprises a second guide, conveniently at least one groove 44, having a first end 46 which is adjacent to the second side 36 of the second block receiver 28 and a second end 48 that is adjacent the second side 32 of the first block receiver 26. As seen in FIG. 5, the first part 14*a* has a first side 50, the third part 14*c* has a first side 52, the fourth part 14*d* has a first side 54, and the fifth part 14*e* has a first side 56. In a preferred embodiment illustrated in FIG. 5, the first guide comprises a pair of parallel grooves 38 and 38' and the second guide comprises a pair of parallel grooves 44 and 44'. Grooves 38 and 38', formed in the first side 50 of first part 14*a* proximal the first side 34 of the second block receiver 28, and grooves 38 and 38' formed in the first side 52 of third part 14*c*, together comprise the grooves 38 and 38' of the first guide. Grooves 44 and 44', formed in the first side 50 of first part 14*a* proximal the second side 36 of the second block receiver, grooves 44 and 44' formed in the first side 54 in fourth part 14*d*, and grooves 44 and 44' that are formed in the first side 56 of fifth part 14*e*, together comprise the grooves 44 and 44' of the second guide. In the apparatus illustrated in FIGS. 1–12 the two parallel grooves 38 and 38' or 44 and 44' formed in each first part 14*a*, 14*c*, 14*d*, and 14*e*, form a helix so that when a line 57 is inserted in the apparatus 10, as seen in FIG. 11 and 12, the line 57 moves continuously from the entry port 60 through the first block receiver 26 the first groove 38 of the first guide, through the second block receiver 28 through the first groove 44 of the second guide, through the first receiver 26 back through the second groove 38' of the first guide through the second block receiver 28 and through the second groove 44' of the second guide.

The end of the groove 44' in the fourth part 14*d* comprises the exit port 58, as illustrated in FIG. 5. The first end of groove 38 of third part 14*c* forms the entry port 60 which is sized to receive the line 57 between the groove 38 and the first side 50 of first part 14*a*, when the apparatus is in the operative position, for lacing a block and tackle assembly. When the apparatus 10 is in the operative position, a portion of the first sides of the parts 14*a*, 14*c*, 14*d* and 14*e* are adjacent to a side of an opposing part or other part that is generally flat forming a tube. For example, the first side 62 of second part 14*b* lies adjacent to a portion of the first side 50 of first part 14*a* creating a tube like structure through which the line 57 passes, as illustrated in FIGS. 11 and 12. In another preferred embodiment extruded tubes may be attached to the plate 14 to form the first guide and the second guide for transport of the line throughout the apparatus 10. These tubes may be comprised of plastic, metal or any other material suitable for the purpose. Appropriate openings are formed in the tubes for access by a threader 16.

The apparatus 10 further comprises a threader shown generally as 16, which is used to move a line 57 through the grooves 38 and 44 for threading of the blocks to form the block and tackle assembly 22. If a single threader 16 were used the second guide 44 would comprise tubes or enclosed grooves to ensure that the line remained within the guide 44. The threader 16 comprises a first member 64 that is rotatably mounted to the frame 12 so that the member lies adjacent the grooves 38 of the first guide keeping the line 57 within the grooves 38. In the embodiment illustrated in FIG. 5, a second threader 17 is included to increase the driving surfaces acting on the line 57. The threader 17 comprises a second member 80 that is rotatably mounted to the frame 12 so that the second member 80 lies adjacent to the grooves 44 of the second guide. The plate 14, particularly parts 14*a* and 14*b* when in the operative position and juxtaposed to one another, as shown in FIG. 1, form a first hole 82 through plate 14 and a second hole 84 through plate 14 that is sized and configured to receive first member 64 and second member 80 respectively. At least one idler 66*a* is attached to the plate 14 so that the idler wheel 68 lies adjacent the member 64 such that the line 57 as it moves along the grooves 38 of the first guide must pass between the idler wheel 68 and the member 64. The idler wheel 68 extends through a break 69 in the grooves 38 of first guide so that the line is engaged simultaneously by the edge 86 of the member 64 and the wheel 68 of the idler 66*a*, as illustrated in FIG. 12. The spacing between the idler wheel 68 and the member 64 is less than the thickness of the line 57 so that the edge 86 of the member 64 and the wheel 68 engage the line 57 advancing it along grooves 38 of the first guide as the member 64 rotates. For smooth advancement of the line 57, a second idler 66*b* is positioned in a manner similar to idler 66*a*, so that the member 64 again engages the line 57 and advances it as the member 64 rotates. As seen in FIG. 5, each idler 66 comprises an arm 70 and a shaft 72 upon which the idler wheel 68 is mounted for rotation. Each idler wheel 68 has a pair of grooves 74 formed circumferentially thereabout that are sized and configured to be aligned with the grooves 38 of the first guide. The arm 70 of the idler 66*a* is mounted to the third part 14*c* of the plate 14 so that the wheel extends inwardly through a hole 76 in the third part 14*c*. The hole 76 is aligned adjacent to the grooves 38 and 38' so that a break 69 is formed in the grooves 38 and 38' permitting the idler wheel 68 of the idler 66*a* to project upwardly through the break 69. Idlers 66*b*, 66*c* and 66*d* are attached to first part 14*a* in the same manner. Idlers 66*c* and 66*d* are aligned adjacent to the second member 80, so that the idlers 66*c* and 66*d* in conjunction with the member 80 frictionally engage the line 57 advancing the line 57 as the member 80 rotates. The first member 64 and the second member 80 each have an outer edge 86 and 86' (FIG. 9) respectively, that has a friction surface thereon, which may be a grooved tread or any other surface suitable for frictionally engaging and advancing a line.

Figure 9:
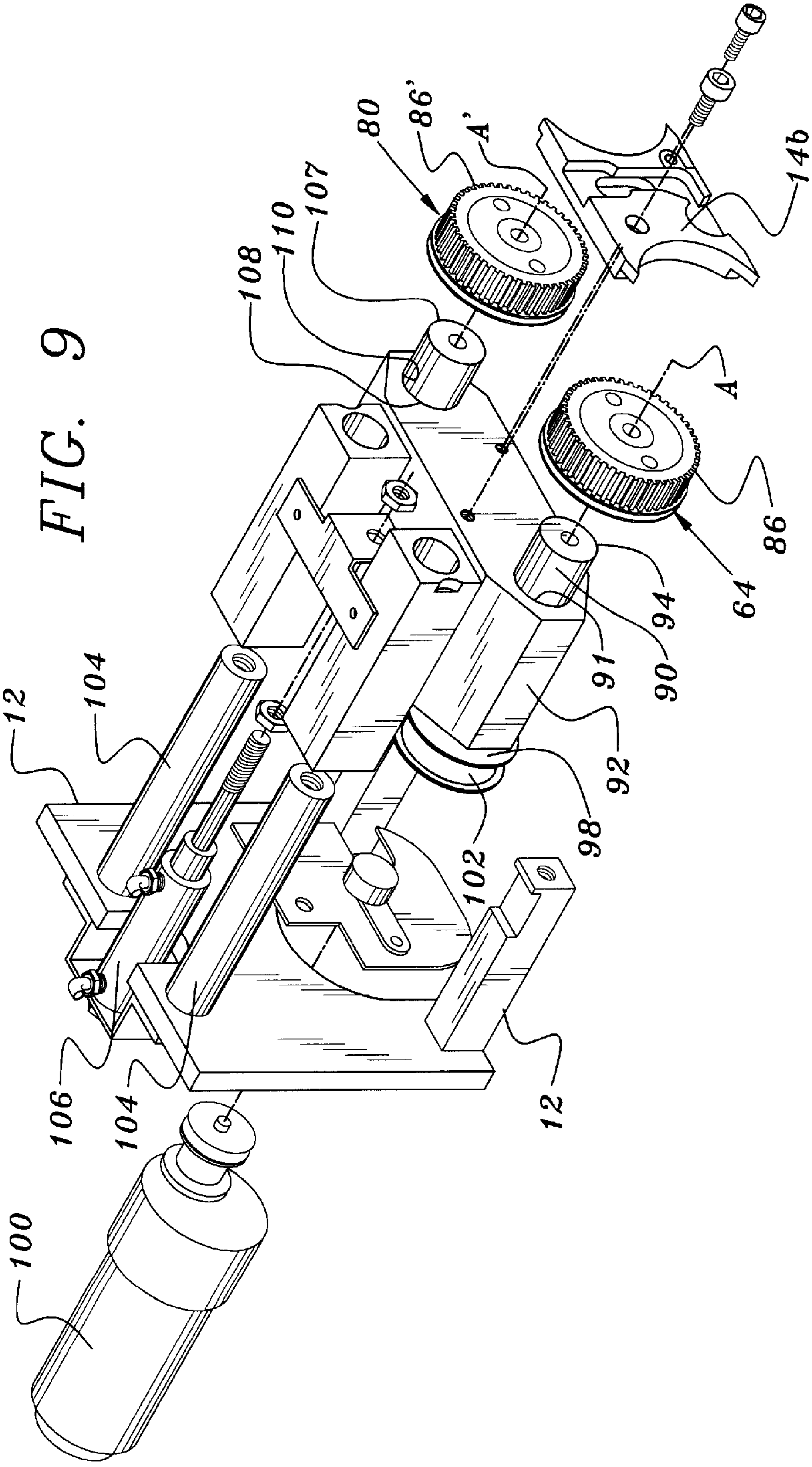
FIG. 9 is a detailed exploded view of the threader, illustrating attachment of a portion of the plate thereto.

As seen in FIG. 1 and FIG. 9, the first member 64 and the second member 80 are slidably mounted to the frame 12 for movement along axes A and A' respectively, the axes being generally perpendicular to the large surface 88 of the first part 14*a*. The members 64 and 80 are selectably moveable between an operating position and an open position. In the operating position the edges 86 and 86' oppose the first side 50 of first part 14*a*, the first side of 52 of the third part 14*c*, the first side 54 of the fourth part 14*d* and the first side 56 of the fifth part 14*e*. This permits the edges 86 and 86' to firmly engage line 57 as it passes over the idlers 66*a* through 66*d*. The edges 86 and 86' may also lightly engage the line as the line moves through the grooves 38 and 38' of the first guide and the grooves 44 and 44' of the second guide. In the open position, the first member 64 and the second member 80 have retracted inwardly along their respective axis A and A' until the members are clear of the grooves 38 and 38' and the grooves 44 and 44'. This permits easy removal of line 57 once a pair of blocks have been laced to form a block and tackle assembly 22.

Figure 3:
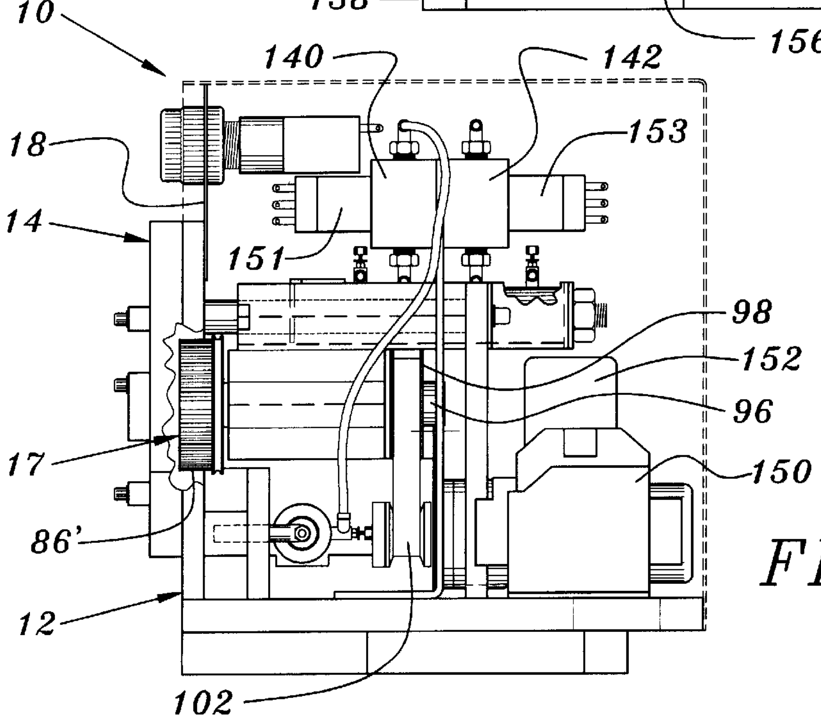
FIG. 3 is a right side elevational view of the invention of FIG. 1.
Figure 4:
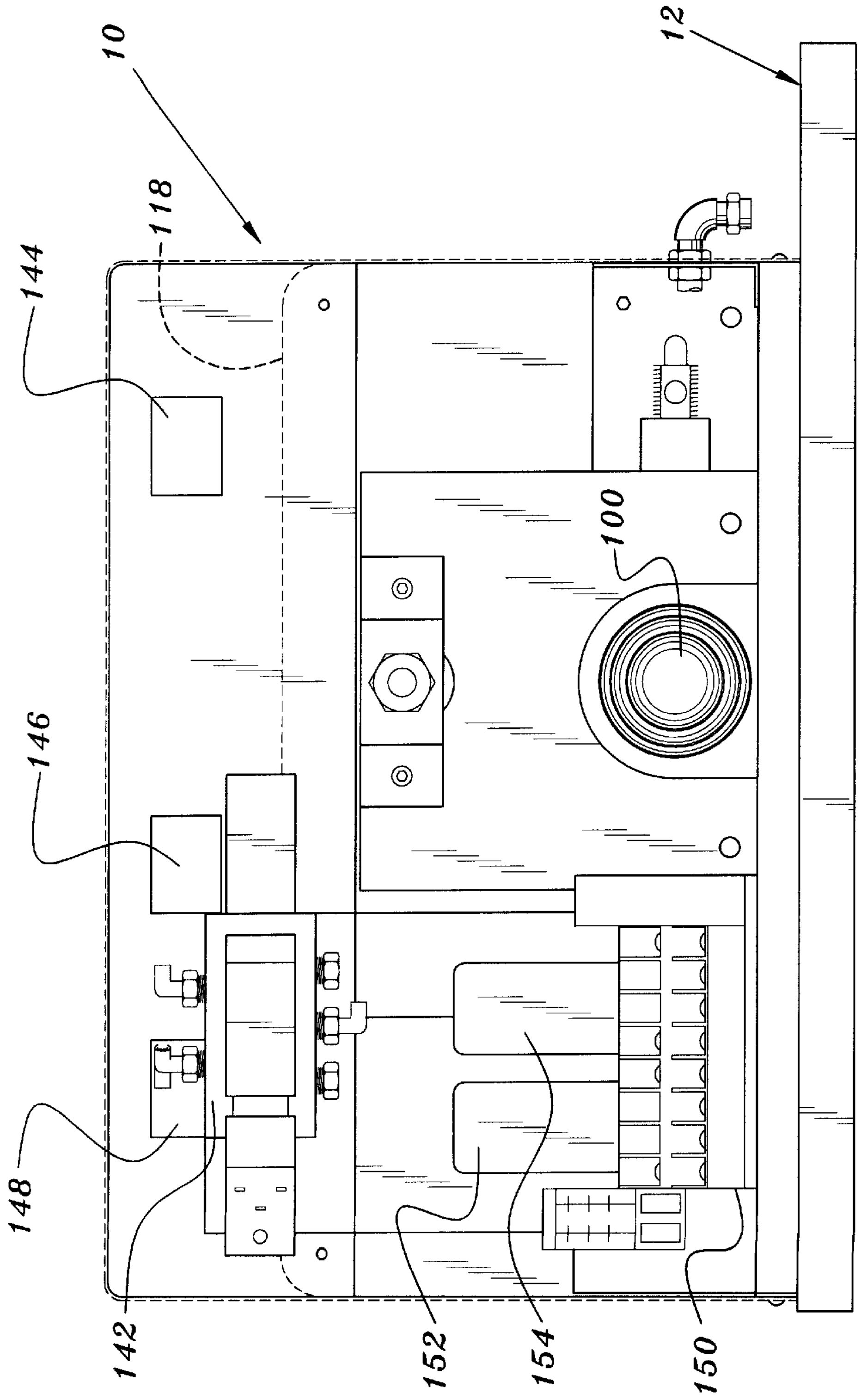
FIG. 4 is a rear elevational view of the invention of FIG. 1.
Figure 7:
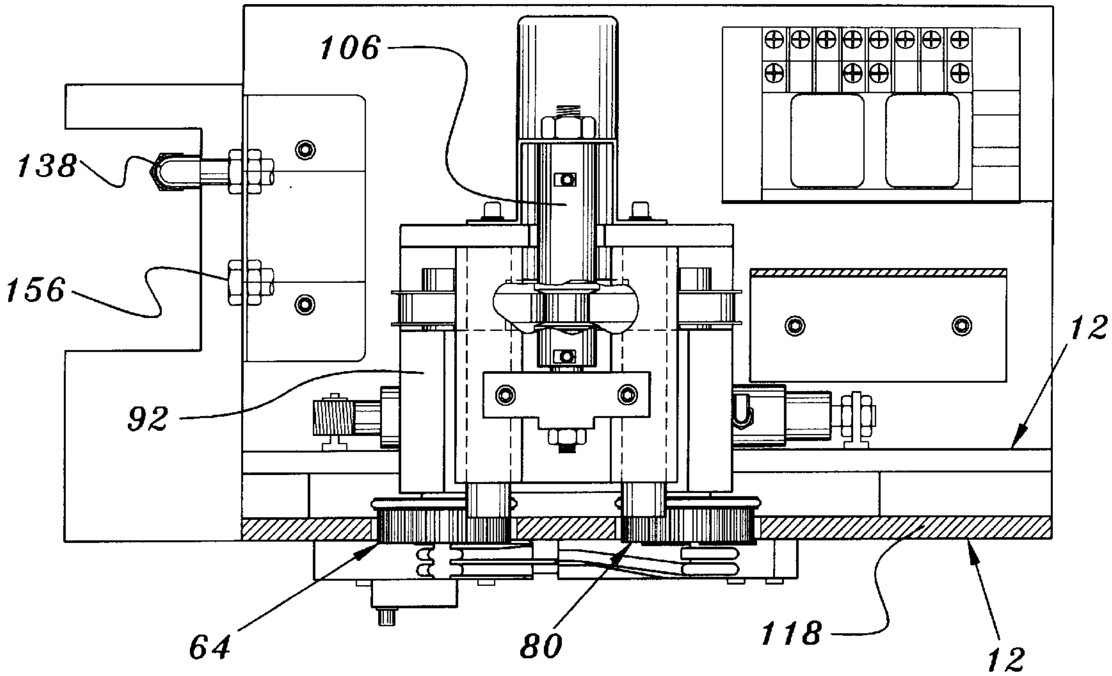
FIG. 7 is a cross sectional view taken along line 7—7 of FIG. 2.

As shown in FIG. 9, the threader 16 further comprises a shaft 90 that is received within a bore 91 in the support member 92 for rotation of the shaft 90. The shaft 90 has a first end 94 that is attached to member 64 and a second end 96, as shown in FIG. 3, which is attached to a pulley 98. As seen in FIG. 10, the pulley 98 is connected to a motor 100 by a belt 102. The support member 92 is slidably mounted on a pair of shafts 104 for movement of the support member 92 and the attached member 64 between the operative position, as illustrated in FIG. 12, and the open position, as illustrated in FIG. 7. A first double acting air cylinder 106 is attached at one end to the frame 12 and at the other end to support member 92 for movement of the support member along the shafts 104. The second threader could independently comprise a separate motor and support member; however, in a preferred embodiment, as illustrated in FIG. 9, the first threader 16 and the second threader 17 share the same motor 100 and the same support member 92. The second member 80 is mounted to the first end 107 of shaft 108 which is received within a bore 110 in the support member 92. The other end 109 of the shaft 108 is attached to a pulley 111 about which the belt 102 extends, as shown in FIG. 10. The motor 100 therefore simultaneously drives both member 64 and member 80 for rotation about their respective axis A and A'.

As shown in FIG. 9, second part 14*b* is also attached to the support member 92 for movement with the support member 92 and the members 64 and 80. Again, this enables the line 57 to be easily removed from the grooves 38 and 38', the first guide, and the grooves 44 and 44', the second guide. In other embodiments particularly those using an enclosed tube, the threader 16 may comprise suction applied to the tube to create reduced pressure in the tube to advance the line 57 therethrough.

As discussed previously, when the apparatus 10 is in the operative position parts 14*c* and 14*d* are proximal the first block receiver 26 and when the apparatus 10 is in the open position the parts 14*c* and 14*d* are moved outwardly from the first block receiver 26 in order to free the line 57 so that it will be easily removed from between the parts 14*e* and 14*d*. The open position is clearly seen in FIGS. 2, 3 and 6.

Figure 8:
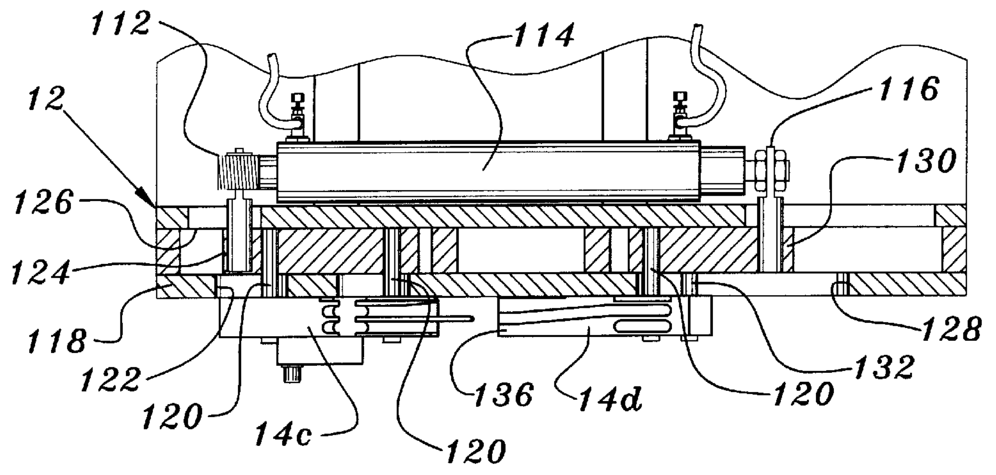
FIG. 8 is a detailed cross sectional view taken along line 8—8 of FIG. 1 with a portion of the plate removed to illustrate the sliding parts of the plate and the related air cylinder.

As seen in FIG. 8, third part 14*c* is connected to the first end 112 of a second double acting air cylinder 114 and fourth part 14*d* is connected to the second end 116 of the second double acting air cylinder 114. The frame 12 further comprises a mounting plate 118 to which is attached the plate 14. The third part 14*c* is mounted to the frame 12 adjacent to mounting plate 118 by a pair of connectors 120 which pass through a first slot 122 formed in the mounting plate 118, and is attached to a block 124 that is slidably received within a channel 126 formed in the frame 12. The fourth part 14*d* is attached by a connector 120 that passes through a second slot 128 and is attached to a second block 130 which is received within the channel 126. The fourth part 14*d* also has a guide pin 132 attached thereto, which extends into the slot 128. When the air cylinder is expanded from its retracted position to its extended position the end 116 moves outwardly until the guide pin 132 engages the end of slot 128, at that time the body of the air cylinder 114 then moves outwardly including the first end 112 so that the block 124 also moves outwardly carrying with it the pair of connectors 120 that are attached to the third part 14*c* until the outer connector 120 engages the outward end of the slot 122. To move to the operative position, the air cylinder is simply retracted so that parts 14*c* and 14*d* move toward one another until the inner limits of the slots 122 and 128 are engaged by the connectors 120. As shown in FIG. 1, second slot 128 has a portion 134 that angles downwardly so that when the guide pin 132 reaches this portion of the second slot 128 the first end 136 of the fourth part 14*d* rotates about the attached connector 120 in a clockwise direction to attain the final open position as shown in FIG. 6. The rotational and lateral movement of the fourth part 14*d* occurs when the fourth part 14*d* is moved from the operative position to the open position clearing the end 136 of fourth part 14*d* from the work product, which will be discussed in more detail below.

The first double acting cylinder 106 and the second double acting cylinder 114 are both connected to a pressurized air source (not shown) which is attached to the apparatus 10 at connection point 138, as seen in FIGS. 1 and 7. Air is supplied from the connection point 138 to a second four way air valve 142 which is selectively activated to distribute air to operate the first double acting cylinder 106. Air is also supplied from the connection point 138 to a first four way air valve 140, which is selectively activated to distribute air to operate the second double acting cylinder 114. For clarity of the drawings the air hoses have not been fully delineated. Air valves controlled by solenoids are well known in the art, and any air valves that are suitable for controlling double acting air cylinders may be used. For example a Dynamco four way air valve, part number 2593-0 with a Model No. D2533KLO DV solenoid attached, manufactured by Dynamco, Inc. of McKinney, Tex., would be suitable for the purpose.

The apparatus 10 is powered by a 24 volt direct current of 1.5 amps that is provided to the apparatus at connection point 156. The control circuitry for operating the apparatus 10 comprises three switches, stop switch 144, start switch 146 and load switch 148, a terminal block 150, a first solenoid 151, a first relay 152, a second solenoid 153 and a second relay 154. Starting with the apparatus 10 in the open position, as shown in FIG. 6, when the load switch 148 is closed an electrical circuit is closed which actuates relay 152 that latches the circuit in a closed condition, activates the second solenoid 153 which switches the second four way air valve 142 so that the air flows into the first double acting air cylinder 106 moving the piston outwardly so that the support member 92 moves toward the plate 14. This places the first member 64 and the second member 80 into the operative position. Upon pushing the start switch 146 an electrical circuit is closed which activates relay 2 which latches the circuit in a closed condition, activates the first solenoid 151 which switches the first four way air valve 140 so that air flows into the second double acting air cylinder 114 proximal to the second end 116 causing the piston of the double acting air cylinder 114 to move inwardly until the second double acting air cylinder 114 is contracted so that the first end 112 and the second end 116 are as close to one another as possible. This action of the second double acting air cylinder 114 causes the third part 14*c* and fourth part 14*d* to move to the operative position where they are proximal to one another. Also, this circuit turns on the motor 100 so that the first member 64 and the second member 80 commence rotating. The stop switch 144 is primarily for emergency stop of the apparatus 10. Engaging the stop switch 144 opens the first relay 152 and the second relay 154 opening the circuits which causes the first solenoid 151 to switch the first four way air valve 140 so that the second double acting air cylinder 114 extends moving the attached third part 14*c* and fourth part 14*d* away from one another to the open position and disengages the motor 100. Upon opening of the first relay the second solenoid 153 switches the second four way air valve 142 so that the air flows into the first double acting air cylinder 106 causing the double acting air cylinder 106 to contract moving the first member 64 and the second member 80 from the operative position to the open position.

The second block receiver 28 comprises a hook 158 upon which a block is hung during the lacing operation. The hook 158 is slidably mounted to the mounting block 118 so that a downward pull on the hook activates a shut-off switch (not shown) that acts in the same manner as the stop switch, in that the shut-off switch opens the first relay 152 and the second relay 154 activating the four way air valves and the double acting air cylinders as discussed above so that the threader 16 and 17 and the third part 14*c* and the fourth part 14*d* are all moved from the operative position to the open position and the motor 100 is shut off. The shut-off switch attached to the hook 158 is activated when the lacing is completed and the line 57 is pulled tightly causing a downward pull on the block that has been attached to the hook 158, causing the hook 158 to move downwardly engaging the shut-off switch. The control switches, solenoids, four way air valves, and terminal block 150 route the current to the appropriate device in the proper sequence. The exact circuitry has not been shown as such circuitry is well known in the art and would be obvious to one skilled in the art.

Adjacent to the second block receiver 28 is a sliding lock 160, which extends downwardly over the upper portion of the block when it is hung on the hook 158 so that the block is locked to the hook and cannot be accidentally disengaged during the lacing operation.

A second embodiment of the lacing apparatus 10 is illustrated in FIG. 13, in which a front elevational view of the lacing apparatus 210 is illustrated. In the second embodiment 210 a single threader 216 has a single member 264 and a plurality of idlers 266. This embodiment is described as having a single groove for lacing a block and tackle assembly with a 2-1 mechanical advantage. As in embodiment 10, two or more grooves in the first and second guides and two or more sheaves in each block may be used to increase the mechanical advantage. The first block receiver 226 and the second block receiver 228 are spaced on opposing sides of the threader 16. In this embodiment, the plate 214 is subdivided into different sized and shaped parts than plate 14 for the lacing apparatus 10. Part 214*a* has a first side 250 in which is formed a portion of the first guide, conveniently a groove 238 and a portion of the second guide, conveniently groove 244, each sized and configured to receive the line therein. As in embodiment 10, the groove 238 extends between the first block receiver 226 and the second block receiver 228 and groove 244 extends between the second block receiver 228 and the first block receiver 226. Parts 214*b* and 214*b'* are retracted with the member 264 when the apparatus 210 is moved from the operative position to the open position. This frees the majority of the line (not shown) with the exception of that line (not shown) which is adjacent to the first block receiver 226. Here again as in apparatus 10, we have two parts, part 214*c* and part 214*d*, that must be movable laterally outwardly to free the line (not shown) and a block 362 inserted within the first block receiver 226. The first side 252 of third part 14*c* has the remainder of the groove 238 of the first guide formed therein. The first side 254 of part 214*d* and the first side 256 of part 214*e* have the remainder of the groove 244 of the second guide formed therein. The remaining structure of this preferred embodiment of the lacing apparatus 210 operates in the same fashion and is constructed in generally the same manner with only a few modifications that would be obvious to one skilled in the art.

The apparatus 10 and the apparatus 210 are primarily constructed from hard coated aluminum with a few parts, particularly the electrical switches and the edge surfaces of the members 64, 80 and 264 which are constructed of rubber, plastic, or other similar material capable of frictionally gripping a line. Steel has been primarily used for shafts and rollers, but in other embodiments, many of the parts may be constructed of plastics or other suitable materials in order to cut manufacturing costs and to reduce the weight of the apparatus 10 and 210. The various parts are attached to one another by machine screws 20, by clips, by welding or by any other suitable means that is well known in the art. A cover 161 may be attached to the frame to protect the apparatus 10 and the operator.

Having thus set forth a preferred construction for the semi-automatic lacing apparatus 10 of this invention, it is to be remembered that this is but a preferred embodiment. Attention is now invited to a description of the use of the semi-automatic lacing apparatus 10. The apparatus 10, may be used to lace block and tackle assemblies for various uses; however, in the embodiment shown in FIGS. 1 through 13, the example illustrated is particularly suited for lacing a block and tackle assembly to be used in the manufacture of window balances.

The following modifications to the apparatus 10 are required to adapt the apparatus 10 for this particular purpose. As seen in FIG. 11, the first block 162 of the block and tackle assembly 22 is pivotally attached by pivot pin 164 to the first end 166 of an aluminum channel 168. The channel 168 comprises a part of the window balance to which the block and tackle assembly 22 is attached. As can be seen most clearly in FIG. 6, a shallow recess 170 is formed in the mounting plate 118 of the frame 12 to receive the first side 171 of the channel 168 that is adjacent to the mounting plate 118 when the first block 162 is inserted within the first block receiver 26. At least one support post 172 is mounted generally perpendicular to the mounting plate 118 to provide a support that the channel 168 may rest upon. The shallow recess 170 is necessary to provide clearance for the first side 171 of the channel 168 between second part 14*d* and the mounting plate 118.

Certainly in other preferred embodiments, the first block 162 could be inserted within the first block receiver 26 of the apparatus 10 without the attached open channel 168. Certain modifications to the apparatus 10 might be necessary to properly support the first block 162 without an open channel 168 being attached.

The apparatus 10 is located at a window balance manufacturing workstation for lacing the block and tackle assembly 22. At the beginning of the lacing cycle the parts 14*c* and 14*d* of the plate 14 are in the open position and the first member 64 and the second member 80 of the threaders 16 and 17 respectively are in the operative position, i.e. the members 64 and 80 are forward ready to receive the second end of the line 57.

The operator receives the first block 162 and the attached open channel 168, a second block 174 and line 57. The operator pushes the load switch 148 moving the threaders 16 and 17 to the operative position, with members 64 and 80 extended. The second block has a first hole 178 and second hole 180 therethrough. The operator ties the first end 176 of line 57 to the second hole 180 of the second block 174 and inserts the second block 174 into the second block receiver 28 by inserting the hook 158 into the first hole 178 of the second block 174 and then closing the sliding latch 160.

Next, the operator takes the first block 162 and the attached channel 168, placing the first block 162 into the first block receiver 26 and simultaneously placing the channel on the support post 172 so that the first side 171 of the channel 168 lies snugly within the recess 170. In the apparatus illustrated in the drawings two grooves are formed in each first part 14*a*, 14*c*, 14*d*, and 14*e*, and each block has at least two sheaves 186. The operator pushes the start switch 146 which turns on the motor 100 causing the first member 64 and the second member 80 to rotate on their axes A and A'. The start switch also activates the second double acting cylinder 114 which moves the third part 14*c* and the fourth part 14*d* toward one another to the operative position. When the fourth part 14*d* moves inwardly the first end 136 pivots downwardly and since the first side 171 of channel 168 is in recess 170 the first end 136 enters the channel 168 so that the exit port is adjacent the first end 166 of channel 168. In other embodiments, the fourth part 14*d* and the fifth part 14*e* may be replaced with parts having a different configuration so that the first end 184 of line 57 may be directed around a third sheave mounted separately from the first and second sheaves 186. The operator inserts the first end 184 of the line 57 into the entrance port 60 through the first block receiver 26 and thus through the first block 162 and under one of its sheaves 186 and into the groove 38 until the line is pinched between rotating member 64 and the idler 66*a*, advancing the line 57 through the grooves.

The first end 184 of the line 57 is caught between the first member 64 and the idler 66*a* frictionally engaging the line 57 therebetween and advancing the line 57 in the groove 38 until the first end 184 of the line 57 is engaged by the first member 64 and the idler 66*b*. The line 57 continues to advance through the second block receiver 28 where it passes between the second block 174 and its attached sheave 186 (over the sheave). The line 57 continues to advance in the groove 44 (the second guide) being engaged and advanced by the idler 66*c* and the second member 80 as well as the idler 66*d* and the second member 80. The first end 184 of the line 57 passes through the groove 44' in the part 44*e* which transfers the line to the second groove 38'. The line 57 continues to be urged forward so that the line 57 passes again through the first block receiver 26 and therefore between the inserted first block 162 and its second attached sheave 186' through the second groove 38' over the second sheave 186' of the second block 174, through the second groove 44' and out the exit port 58. The parallel grooves form a helix so that the line moves continuously from the entrance port 60 to the exit port 58. Passing through the first and second guides twice laces the blocks to one another so that the block and tackle assembly 22 has a mechanical advantage of 4 to 1. In other preferred embodiments, the apparatus 10 may comprise a single groove so that the line makes a single pass through the first and second guides providing a block and tackle assembly having a 2 to 1 mechanical advantage. When the line 57 is fully extended through the apparatus 10 it pulls the second block 174 downwardly causing the hook 158 to move downwardly activating the shut off switch to the motor 100 so that the first member 80 and second member 68 cease rotating. Additionally, the apparatus 10 moves to the open position, whereby the first double acting air cylinder 106 retracts the first member 64 and the second member 80 and the second double acting air cylinder 114 moves the first third part 14*c* and the fourth part 14*d* to the open position so that the laced block and tackle assembly 22 may be removed from the apparatus 10. The operator removes the block and tackle assembly 22 from the apparatus 10 and then pivots the first block 162 until the block and tackle assembly 22 is inserted within the channel 168.

While the foregoing has described several particularly preferred embodiments of the apparatus of this invention, numerous other variations and modifications, all within the scope of the invention, will readily occur to those skilled in the art. Accordingly, the descriptions are to be considered only as illustrative of the principles of the invention and not to be limitative thereof. The scope of the invention is to be defined solely by the claims appended thereto.

What is claimed:

1. An apparatus for lacing a block and tackle assembly that includes a first block with at least one sheave, a second block with at least one sheave and a line; said apparatus comprising:

a frame;

a plate connected to said frame, said plate having a first block receiver, said first block receiver having a first side and a second side and being sized and configured for receipt of a first block therein; said plate having a second block receiver formed therein, said second block receiver having a first side and a second side and being sized and configured for receipt of a second block therein; said plate having a first guide, said first guide having a first end adjacent said first side of said first block receiver and a second end adjacent said first side of said second block receiver, said first end of said guide having an entry port therein sized and configured to receive a line therethrough; and said plate having a second guide, said guide having a first end adjacent said second side of said second receiver and a second end adjacent said second side of said first receiver, said second end of said second guide having an exit port therein; and at least one threader mounted to said frame said threader engaging a line and advancing the line through said first block receiver, said first guide, said second block receiver, and said second guide, such that when a first block is received in said first block receiver, a second block is received in said second block receiver and the line is fed to said threader through said entry port, said line passes between the first block and the sheave of the first block and the line passes between the second block and the sheave of the second block, whereby the blocks are laced to one another by the line.

2. An apparatus as in claim 1, said threader comprising a member rotatably connected to said frame adjacent to at least one of said first and second guides and engages and advances the line when the line is received in said one of said first and second guides, said member being selectively driven for rotation about an axis generally perpendicular to said plate; and a motor connected to said frame and to said member for driving said member.

3. An apparatus as in claim 2 wherein said first guide has a break therein; said threader further comprising an idler rotatably attached to said plate adjacent to at least one guide of said first and second guides so that a portion of said idler projects into said break in said at least one guide such that when said line is received in said at least one guide said line is engaged simultaneously by said member and said idler for advancement of the line along said first and second guides.

4. An apparatus as in claim 1, said threader comprising a first and a second member connected to said frame for rotation, said first member being adjacent said first guide and said second member being adjacent said second guide, each said member engaging and advancing the line when the line is received in said adjacent guide, said first and second members being selectively driven for rotation about an axis generally perpendicular to said plate; and a motor connected to said frame and to said member for driving said member.

5. An apparatus as in claim 4, said threader further comprising an idler attached to said plate adjacent one of said first and second guides, said one guide having a break therein adjacent said idler such that a portion of said idler projects into said break and lies proximal said adjacent member such that when the line is received in said one guide the line is engaged simultaneously by said adjacent member and said idler for advancement of the line along said first and second guides.

6. An apparatus as in claim 5, wherein said threader comprises a plurality of idlers.

7. An apparatus as in claim 2 wherein said second receiver comprises a means for mounting the second block therein, and a cutoff switch being connected to said means for mounting said second block such that when a block is mounted therein and pulled against said means for mounting said second block, the cutoff switch is activated turning off said motor driving said member.

8. An apparatus as in claim 2 wherein said member is slidably attached to said frame for movement along an axis normal to said plate between an operative position and an open position, whereby when said member is in said open position and the block and tackle is threaded with the line it may be easily removed from said apparatus.

9. An apparatus as in claim 2 wherein said plate comprises a first part attached to said frame, a second part slidably connected to said frame for movement between an operative position and an open position, a third part being slidably attached to said frame for movement between an operative position and an open position, a fourth part being slidably attached to said frame for movement between an operative position and an open position, and a fifth part being attached to said frame whereby when said parts are in the open position and the block and tackle is threaded with the line it may be easily removed from said apparatus.

10. An apparatus as in claim 9 wherein said first, third, fourth and fifth parts of said plate each have a first side and said first guide comprises at least one groove formed in at least a portion of said first side of said first and third parts and said second guide comprises at least one groove formed in at least a portion of said first side of said first, fourth and fifth parts of said plate, said grooves being sized and configured to receive a predetermined size of line therein.

11. An apparatus as in claim 10, wherein a pair of grooves are formed in said first side of said first, third, fourth and fifth parts, said pair of grooves forming a helix such that when the first and second blocks have a pair of sheaves mounted on a single axis and the line is advanced through said first and second guides, the block and tackle is threaded about each sheave.

* * * * *